July 28, 1953 S. L. TOLMAN 2,647,085
APPARATUS FOR REMOVING GRIT FROM SEWAGE
Filed March 28, 1949
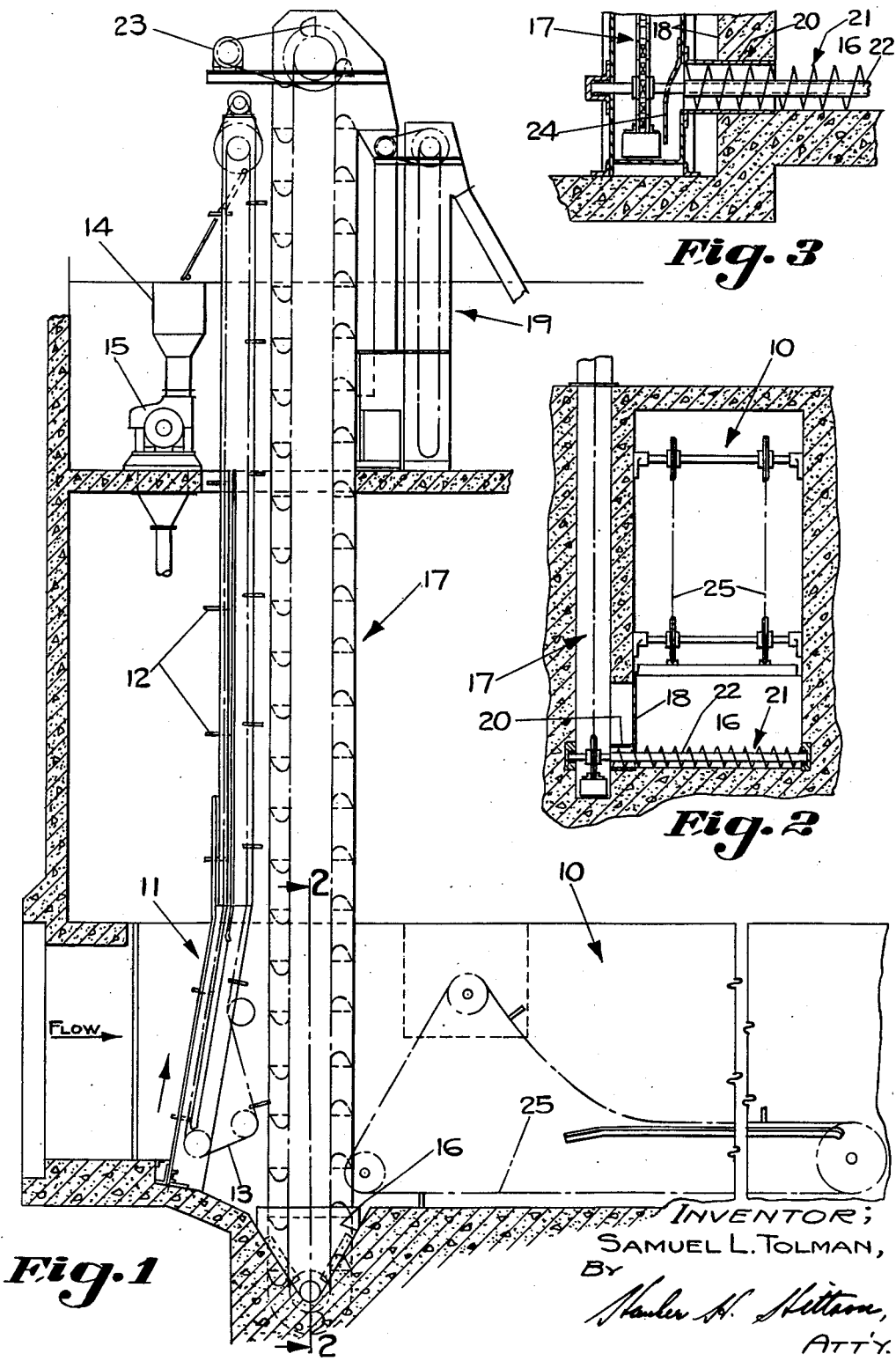
INVENTOR;
SAMUEL L. TOLMAN,
BY
ATT'Y.

Patented July 28, 1953

2,647,085

UNITED STATES PATENT OFFICE 2,647,085

APPARATUS FOR REMOVING GRIT FROM SEWAGE

Samuel L. Tolman, Columbus, Ohio, assignor to The Jeffrey Manufacturing Company, a corporation of Ohio Application March 28, 1949, Serial No. 83,932

1 Claim. (Cl. 210—3)

This invention relates to apparatus for collecting and treating solids settled from a flowing stream of liquid, such as the grit settled in a grit channel from a stream of sewage, and an elevator mechanism associated with a grit hopper, in which there is a screw conveyer which controls the delivery or flow of the collected solids into the bottom or boot of the elevator.

An object of the invention is therefore to produce an apparatus of the above mentioned type.

A further object of the invention in a more detailed aspect is to provide in apparatus of the above mentioned type a trash removing screen ahead of the grit hopper at the influent end of the settling basin or grit channel, together with conveyer means for moving settled solids forwardly or in an upstream direction through the grit channel and into the grit receiving hopper; there also being a screw conveyer in the grit receiving hopper, the operation of which is controlled by the operation of a grit removing elevator, which screw conveyer when the elevator is not operating prevents the flow of grit from the grit channel into the elevator.

Other objects of the invention will appear hereinafter, the novel features and combinations being set forth in the appended claim.

In the accompanying drawing,

Fig. 1 is a side elevational view of an installation incorporating the features of my invention;

Fig. 2 is a sectional view taken on the line 2—2 of Fig. 1, looking in the direction of the arrows; and Fig. 3 is an enlarged view of a modification of the controlling cylindrical feed pipe and associated screw conveyer which controls the flow of the solids from the grit hopper into the bottom or boot of the dewatering elevator.

Referring first to Fig. 1 of the drawings, it will be seen that there is a settling basin or tank in the form of a grit channel 10 which may be of poured concrete, through which solids bearing liquid, such as sewage and the like, may flow, the liquid entering the channel 10 adjacent the left-hand or influent end, as illustrated by the arrow, and flowing therethrough. Grit channel 10 is shown as a part of a building within which additional apparatus is housed, as hereinafter described.

As the liquid flows through the substantially unrestricted influent end or opening of the grit channel 10 it is screened by a trash screen 11 with which raking mechanisms 12 are associated which are carried on a pair of endless chains 13. The rake mechanisms 12 remove accumulated trash from the screen 11 and discharge it into a receiving hopper 14, by which it is delivered to a grinder 15, from which the reduced material is delivered to the flowing stream. The construction of the screen 11 and associated parts may follow that disclosed in my application, Serial No. 76,518, filed February 15, 1949, for an Improvement in Bar Screening Apparatus for Flowing Streams of Water.

Also adjacent the influent end of the grit channel or basin 10 and just downstream of the screen 11 there is a grit hopper 16 which is generally trough or V-shaped in cross-section and which is formed in the bottom of said grit channel 10. The axis of the grit hopper 16 extends transversely of the longitudinal axis of the grit channel 10, or, in other words, transverse to the normal flow of fluid therethrough.

Adjacent one side of the grit hoppper 16 there is a receptacle in the form of a de-watering bucket elevator 17 which is separated from the grit channel 10 and the hopper 14 by a wall or partition 18. The dewatering elevator 17 is adapted to elevate sludge, grit or other solids which accumulate in the grit hopper 16 and dewater it to some extent while it is being elevated. The elevated solids are delivered to a jig, washer or other receptacle 19 wherein the inorganic solids are preferably scrubbed of adhering organic material, or, in other words, the grit is washed, the cleaned grit being discharged along one path and the removed organic material being returned to the flowing stream.

To control the feed rate of the accumulated solids from the grit hopper 16 to the boot or bottom of the receptacle or elevator 17, the wall or partition 18 is provided with a cylindrical feed pipe 20, through which the solids must pass from the hopper 16 to reach the receptacle or elevator 17.

In the bottom of the grit hopper 16 there is a spiral or screw conveyer 21 having a shaft 22 mounted at one end in an appropriate bearing adjacent one side wall of the grit channel 10. The shaft 22 of the screw or spiral conveyor 21 extends entirely through the feed pipe 20 and the other end is supported in an appropriate bearing in the bottom of the bucket elevator 17, said shaft 22 thereby constituting the foot shaft of said bucket elevator 17. The head shaft of the bucket elevator 17 is power driven from a motor 23 and thus the screw conveyer 21 is driven from said motor 23 through the chain of said bucket elevator 17.

The flights of the screw conveyer 21 at its discharge end have their peripheries adjacent the inner cylindrical wall of the feed pipe 20, said flights preferably being radially continuous from the shaft 22 and preferably being so correlated to the length of the feed pipe 20 that at least two full flights thereon extend into said feed pipe 20.

As a consequence of this construction it is evident that the solids which accumulate in the grit hopper 16 will flow into the receptacle or bottom of the elevator 17 only as controlled by the rotation and feeding action of the screw conveyer 21.

The speed of the spiral or screw conveyer, the diameter of the foot sprocket of the elevator 17, and the size of buckets of said elevator are so proportioned that when the elevator is operated the screw conveyer 21 will give a controlled feed to the boot of the elevator so that no parts of the elevator will be overloaded.

In Fig. 3 of the drawing, a modification of the feed control mechanism between the grit hopper 16 and the boot of the elevator 17 is shown, the only significant difference, as compared with Fig. 2, being that a baffle plate 24 is provided adjacent the discharge end of the feed pipe 20, which, when looking along the axis of the shaft 22, completely covers the opening of feed pipe 20 but which is actually spaced therefrom preferably adjacent its bottom, it being attached adjacent its top to the feed pipe 20. The spacing between the bottom of the baffle plate 24 and the adjacent bottom wall of the foot or bottom of the hopper 16, or, in other words, the spacing between the bottom of the baffle plate 24 and the bottom of the feed pipe 20, provides for controlled feeding of the solids material from the grit hopper 16 into the boot of the elevator 17, as controlled by the screw conveyer 21, feed pipe 20 and the baffle plate 24.

When the screw conveyer 21 and elevator 17 are idle there will be substantially no flow of solids through the feed pipe 20 and thus there will be no tendency for the dewatering elevator to become choked up during inactive periods. This makes it entirely practical to operate the complete installation only intermittently without there being any objectionable overloading of the apparatus, since under normal conditions the solids will not accumulate at such a rate as to justify the continuous operation of the elevator 17, the washer 19 and the grinder 15.

From the foregoing it will be seen that the baffle 24 cooperates to form a downwardly extending path for grit fed from the tank through the feed pipe 20 to the elevator and that there is always some grit at the bottom of the elevator. The bottom end or edge of the baffle 24 will extend below or into this grit at the bottom of the elevator when the elevator 17 and screw conveyer 21 are not operating and therefore when this condition exists grit, in order to pass from the tank to the elevator, must be forced into the grit at the bottom of the elevator. Thus the screw conveyer 21 and tube 20 cooperate when the conveyer 21 starts to "extrude" the grit into the bottom of the elevator 17.

It is important to note that in the operation of the apparatus the first solids to settle in the grit channel 10 collect in the grit hopper 16 and that those solids which are the last to settle, that is, those solids which settle from the sewage stream after it has flown over the grit hopper 16, are conveyed in the upstream direction in the grit channel 10 toward the influent end thereof and are discharged into said grit hopper 16. This conveying of the last solids to settle is effected by a settled solids scraper conveyer 25 which is of essentially standard construction and includes flights adapted to scrape settled material from the bottom of the basin, settling tank or grit channel 10 and scrape it into the grit hopper 16. Any standard drive mechanism, not illustrated, may be employed to drive the scraper conveyor 25.

Obviously those skilled in the art may make various changes in the details and arrangement of parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

Apparatus for removing grit from sewage including in combination, a grit channel into which settleable solids flow in a fluid stream, a screen at the influent end of said grit channel for removing trash from said fluid stream before it flows into said grit channel, a grit hopper in the bottom of said grit channel adjacent its influent end extending transversely thereof and downstream of said screen whereby the first grit to settle from said fluid stream collects in said grit hopper, a scraper conveyor in said grit channel downstream of said grit hopper for scraping grit in an upstream direction into said grit hopper, a bucket elevator at one side of said grit channel having a foot shaft adjacent one end of said grit hopper, wall means separating said bucket elevator from said grit channel, a short cylindrical feed pipe substantially in axial alignment with said bucket elevator foot shaft connecting said grit hopper and bucket elevator, a screw conveyor in said grit hopper extending substantially the full length thereof and at its discharge end extending into said short cylindrical feed pipe, and a baffle in said elevator co-operating to form a downwardly extending path for grit discharged from the end of said cylindrical feed pipe, said baffle having its bottom edge spaced from said feed pipe and the bottom of said elevator, said bucket elevator foot shaft being common to both said bucket elevator and said screw conveyor whereby when said bucket elevator is operated said screw conveyor is operated to feed grit at such a rate that said bucket elevator cannot become overloaded, said screw conveyor, feed pipe and baffle cooperating to stop the flow of grit from said grit hopper into said elevator when said elevator is not in operation.

SAMUEL L. TOLMAN.

References Cited in the file of this patent

UNITED STATES PATENTS

| Number | Name | Date |
| --- | --- | --- |
| 1,334,841 | Cooley | Mar. 23, 1920 |
| 1,404,573 | McGee | Jan. 31, 1922 |
| 1,716,228 | Horne | June 4, 1929 |
| 2,052,091 | Green | Aug. 25, 1936 |
| 2,131,690 | Marshall | Sept. 27, 1938 |
| 2,137,421 | Tark | Nov. 22, 1938 |
| 2,221,444 | Dodge et al. | Nov. 12, 1940 |
| 2,254,176 | Fischer | Aug. 26, 1941 |
| 2,267,608 | Hawley | Dec. 23, 1941 |
| 2,309,002 | Nichols | Jan. 19, 1943 |
| 2,425,932 | Green et al. | Aug. 19, 1947 |
| 2,517,117 | Komline | Aug. 1, 1950 |

FOREIGN PATENTS

| Number | Country | Date |
| --- | --- | --- |
| 440,428 | Germany | of 1927 |